United States Patent [19]

Gannett et al.

[11] 3,983,327

[45] Sept. 28, 1976

[54] ELECTRICAL SIGNALING

[75] Inventors: Danforth K. Gannett, Mountain Lakes; Andrew C. Norwine, Short Hills, both of N.J.

[73] Assignee: Bell Telephone Laboratories, Incorporated, Murray Hill, N.J.

[22] Filed: July 9, 1945

[21] Appl. No.: 603,936

[52] U.S. Cl. .............................. 179/1.5 R; 340/355

[51] Int. Cl.[2] ........................................... H04L 9/02

[58] Field of Search .................... 179/15, 1.5, 1.5 R; 250/27 CC; 178/22; 340/348, 355, 359

*Primary Examiner*—Howard A. Birmiel

*Attorney, Agent, or Firm*—H. A. Burgess

EXEMPLARY CLAIM

1. A signal value permuting system comprising a succession of reentry circuits having successively higher reentry point values, means to send signals through a plurality of said reentry circuits in tandem, and a key for each reentry circuit, means to add key and signal values together at the input side of each reentry circuit, each key having a range of values the maximum value of which is lower than the reentry point value of the reentry circuit with which the respective key is associated.

12 Claims, 8 Drawing Figures

INVENTORS: D. K. GANNETT
A. C. NORWINE

BY

ATTORNEY

INVENTORS: D. K. GANNETT
A. C. NORWINE

BY H. A. Burgess

ATTORNEY

INVENTORS: D. K. GANNETT
A. C. NORWINE
BY
H. A. Burgess
ATTORNEY

INVENTORS: D. K. GANNETT
A. C. NORWINE
BY
H. A. Burgess
ATTORNEY

ELECTRICAL SIGNALING

The present invention relates to the enciphering of signals for purposes of secret transmission; also to their decipherment upon reception.

The invention is concerned with the type of enciphering in which a secret key is used in the form of a current varying in magnitude with time in irregular manner. This key is, in effect, added to the signal in the enciphering process to produce summation waves varying in irregular manner. In order to decipher these waves a duplicate key is, in effect, subtracted from the summation waves, giving back the signal. By using the principle of reentry along with the addition of key and signal waves, all signal characteristics can be completely obscured assuming a sufficiently random variation in the key wave.

It has also been proposed to enciper signals by permuting their values in successive instants of time. For example, if the signal varies in steps 0, 1, 2, 3 and if the enciphered signal is also to vary in steps, it has been proposed to first translate each step of signal value into a mark on an individual one of, in this case, four conductors and then to use a fourterminal circuit permuter to interchange connections between the four input terminals and four output terminals. Original signal step 1, for example, might, then, emerge from the permuter on any one of four leads corresponding to any step value 0, 1, 2 or 3. Translation is made from the marks on these leads into step values of current or voltage to give an enciphered signal. Ideally the permuter would be so constructed as to give an equal chance that a given value of input signal would be changed into any one of the possible values of output signal.

Instead of using mechanical switching apparatus as permuter to effect interchanges between input and output terminals, it is shown in D. K. Gannett application for patent Ser. No. 592,962 filed May 10, 1945, which issued on March 16, 1976 as U.S. Patent 3,944,744, that the permutations can be effected by mechanically static elements under control of key currents. As shown in that application, complete permutation of all step values of the signals requires use of either a comparatively large number of such current responsive elements, located at cross-over points between signal and key leads, or else a succession of permuter circuits each supplied with a separate key.

In accordance with the present invention, complete permutation of signal values can be effected by use of a succession or reentry circuits each supplied with a key current. Some saving in apparatus is realized over what would be required to obtain complete permutation by use of successive permuter networks supplied with separate keys in accordance with the disclosure of the Gannett application.

In other words, the results obtained by use of permuters can also be obtained by use of the reentry principle heretofore applied to the enciphering of signals by addition of key waves, but in order to obtain complete permutation by use of this principle, a succession of reentry circuits each supplied with a separate key wave is required.

The object of the invention is to encipherment or decipherment of signals by use of key currents and successive reentry circuits having different reentry points.

The nature and objects of the invention will appear more fully from the following detailed description taken in connection with the accompanying drawings in which.

Figure 1:
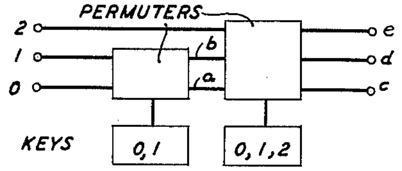
FIGS. 1 and 2 are simplified block diagrams showing two general methods of enciphering, by permuting and by using keys and reentering at different step values.
Figure 2:
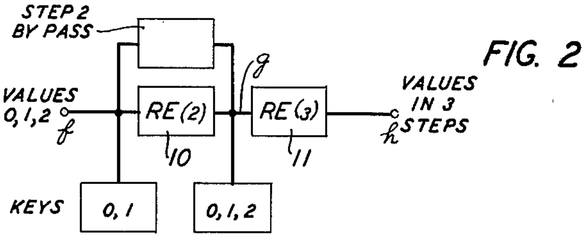

FIGS. 1 and 2 have been drawn to illustrate the similarity in results obtainable by permuters and by reentry circuits. In FIG. 1 three separate terminals 0, 1 and 2 are permuted among themselves such that a current on any one of them produces a responsive current on some one output terminal *c* or *d* or *e*. In FIG. 2, on the other hand, three values of current assumed as step values 0 or 1 or 2 on input terminal *f* produce responsive current also varying in steps on output terminal *h*.

In FIG. 1 the permuters may be of the type disclosed in the Gannett application referred to or other suitable type. One permuter is a 2 × 2 permuter and the other is a 3 × 3 permuter. It can readily be shown that a marking current on terminal 0 will produce a responsive marking current on either lead *a* or *b* depending upon whether the key current is 0 or 1 and that a marking current on terminal 1 will produce a responsive marking current on either lead *a* or *b* depending upon which of the two key values is impressed at the same time. In a similar way, a marking current on any one lead *a*, *b* or 2 will produce a responsive marking current on one of the output terminals *c*, *d* or *e* depending entirely upon the key value that is used. Complete permutation is therefore obtainable between terminals 0, 1, 2 and terminals *c*, *d*, *e*.

In FIG. 2 a by-pass is assumed around or through reentry circuit 10 for current having the value, step 2. If the input current is step 0, this appears at point *g* as either 0 or 1 depending upon whether the key value is 0 or 1. If the input current is step 1 and the key is 0, this appears as step 1 at *g* but if the key value is step 1 also, this gives a summation of of $1 + 1 = 2$ steps of input current to reentry circuit 10 and since this circuit is set to reenter at step 2, the current produced at point *g* is $2 - 2 = 0$. In either case, then, either an input value of step 0 or of step 1 will produce at point *g* a a current of either 0 or 1 step value depending on the key value.

The input to reentry 11 representing the summation of signal plus key can have any step value from 0 to 4. If the summation is 0 or 1 or 2, this is the value which appears at terminal *h*. If the summation is 3, the output at *h* is 0 since the circuit reenters at step 3, and if the summation is 4, the output at *h* is 1. The total range of step values at *h* is therefore 0, 1, 2 and any one of these step values can result from any impressed step value of current depending entirely upon the key currents used.

The basic plan of circuit of either FIG. 1 or FIG. 2 can, of course, be extended indefinitely to provide for any number of circuit terminals or current values.

Figure 3:
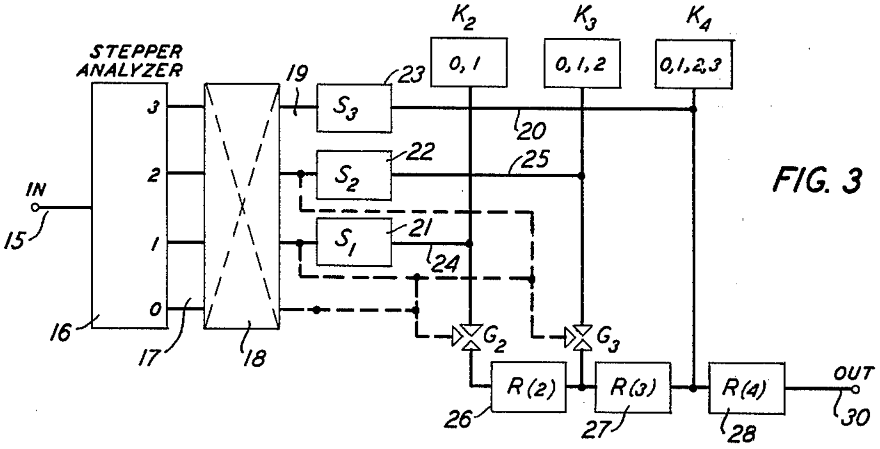
FIGS. 3 and 4 show in block schematic form a transmitting and a receiving circuit, respectively, according to one form of the invention.

Referring to FIG. 3, message signals applied at 15 pass into a stepper analyzer 16 where each different step value of signal energizes a different output lead 17. The illustration is for a four-value signal, counting 0 as one value. Only one lead 17 is energized at a time. A cross-connecting panel 18 enables changes in code to be made at times according to a program by interconnecting leads 17 to different output leads 19. The upper output lead 19 is connected to a stepper or to a potentiometer 23 which weights the current on line 20 giving it a 3-step value whenever upper lead 19 is energized from the input signal. Similar steppers or potentiometers 21 and 22 give respectively 1-step and 2-step current values on respective leads 24 and 25.

Three reentry circuits are provided at 26, 27 and 28 having reentry points at respectively 2-step, 3-step and 4-step values. Gaps $G_2$ and $G_3$ are normally open (nonconducting) but are arranged bo be closed (rendered conducting) by the presence of currents on certain of the lower three conductors 19 in the order indicated by the broken lines which represent controls for closing the respective gaps.

Three keys are provided at $K_2$, $K_3$ and $K_4$ each having the step values indicated.

In the operation of this circuit, whenever top lead 19 receives a signal, a 3-step current is produced in lead 20 which is added to $K_4$ and applied to reentry 28. If the key is 0, a 3-step current is sent to output line 30. If the key is 1, the sum current applied to reentry 28 is 4 steps and since the reentry point is at step 4, the output current is 0. If the key were 2, the output would be 1 step, etc.

If the second highest lead 19 receives a signal, gap $G_3$ is closed and the 2-step signal current in line 22 is added to $K_3$ and applied to reentry 27, the output of which never exceeds 2 steps. This output combines with $K_4$ and is applied to reentry 28. Reentry 27 converts inputs of 3 and 4 steps into, respectively, outputs of 0 and 1 step.

If the signal appears on lead 21 (1 step), both gaps $G_2$ and $G_3$ are closed, the 1-step signal in lead 21 is added to $K_2$ and applied to reentry 26 which puts out only steps 0 and 1, since it reenters at step 2. If the lowermost conductor 19 receives a signal, there is no addition of any signal and key in this case but both gaps $G_2$ and $G_3$ are closed so that all three keys are applied to their respective reentries.

It will thus be seen that current on line 20 is affected only by $K_4$; that current on line 25 is affected by both $K_3$ and $K_4$; that current on line 24 is affected by all three keys and that when current appears on the bottom line 19, it is treated as zero signal but causes the three keys to be applied.

Figure 4:
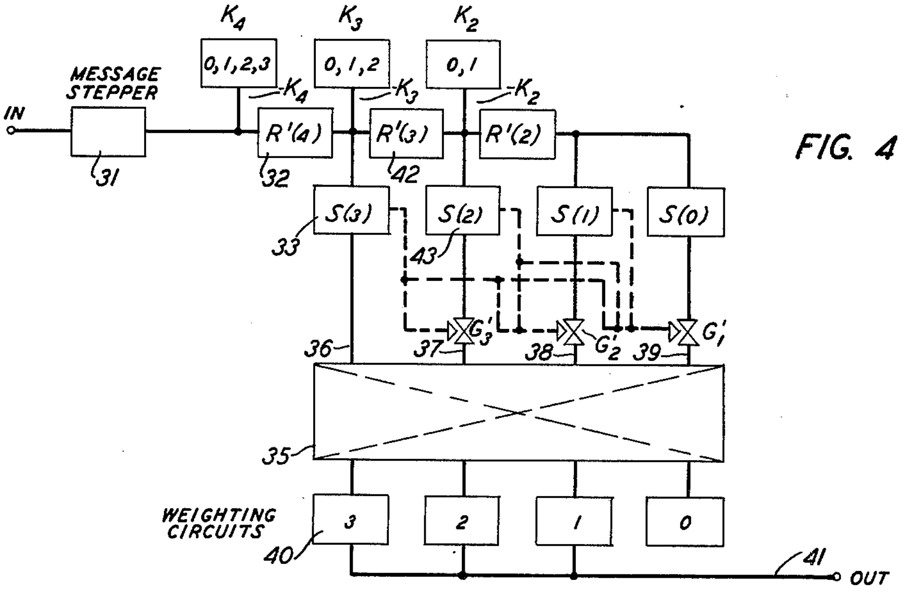

Referring to FIG. 4, the signals received from an enciphering circuit according to FIG. 3 are applied to a message stepper 31 which puts out positive voltage steps to reentry 32. This is the counterpart of reentry 28 and adds 4 steps whenever the stepper 31 output current minus the key is negative. In the receiving case the key is negative. In the receiving case the key is subtracted instead of added and this is indicated on the figure by having a minus sign applied to the symbol for the key. If the signal at the sending point in FIG. 3 had been on lead 20 (step 3) and the key were 1 step, making a total of 4 steps, the send current was zero. When the key is subtracted at the receiver, therefore, it gives −1 step which causes reentry 32 to add 4 steps restoring the original signal of step 3 value.

A stepper tube 33 is provided which responds only to step −3 current in the output of reentry 32 and when it responds, it disables the normally conducting (closed) gaps $G_1'$, $G_2'$ and $G_3'$. This prevents application of energy via these gaps to any one of the input terminals 37, 38 or 39 of the cross-connecting panel 35. A marking current is however sent into terminal 36. These input terminals can be variously connected to the four output terminals connected to weighting circuits 40 which apply different stepped values of current to output 41 leading to a receiver of suitable type. The cross-connection made in frame 35 must be the same as those in frame 18 at the transmitter.

If the signal at the sending point had been on lead 25 (2 steps) and $K_3$ is assumed to be 2 steps while $K_4$ is assumed as of 3-step value, the sent signal would be zero as before. When the key of 3 steps is subtracted giving a resultant of −3 steps, reentry 32 changes this to 1 step. It will be noted that stepper 33 does not respond to this. The 1 step combines with the key of −2 steps to give −1 step resultant which causes reentry 42 to add 3 steps giving back the original 2 steps signal. Stepper 43 responds to only this value of current, disabling gaps $G_1'$ and $G_2'$ but causing a marking current to be sent through normally closed gap $G_3'$ into terminal 37. The other elements of the system operate in analogous manner.

Figure 5:
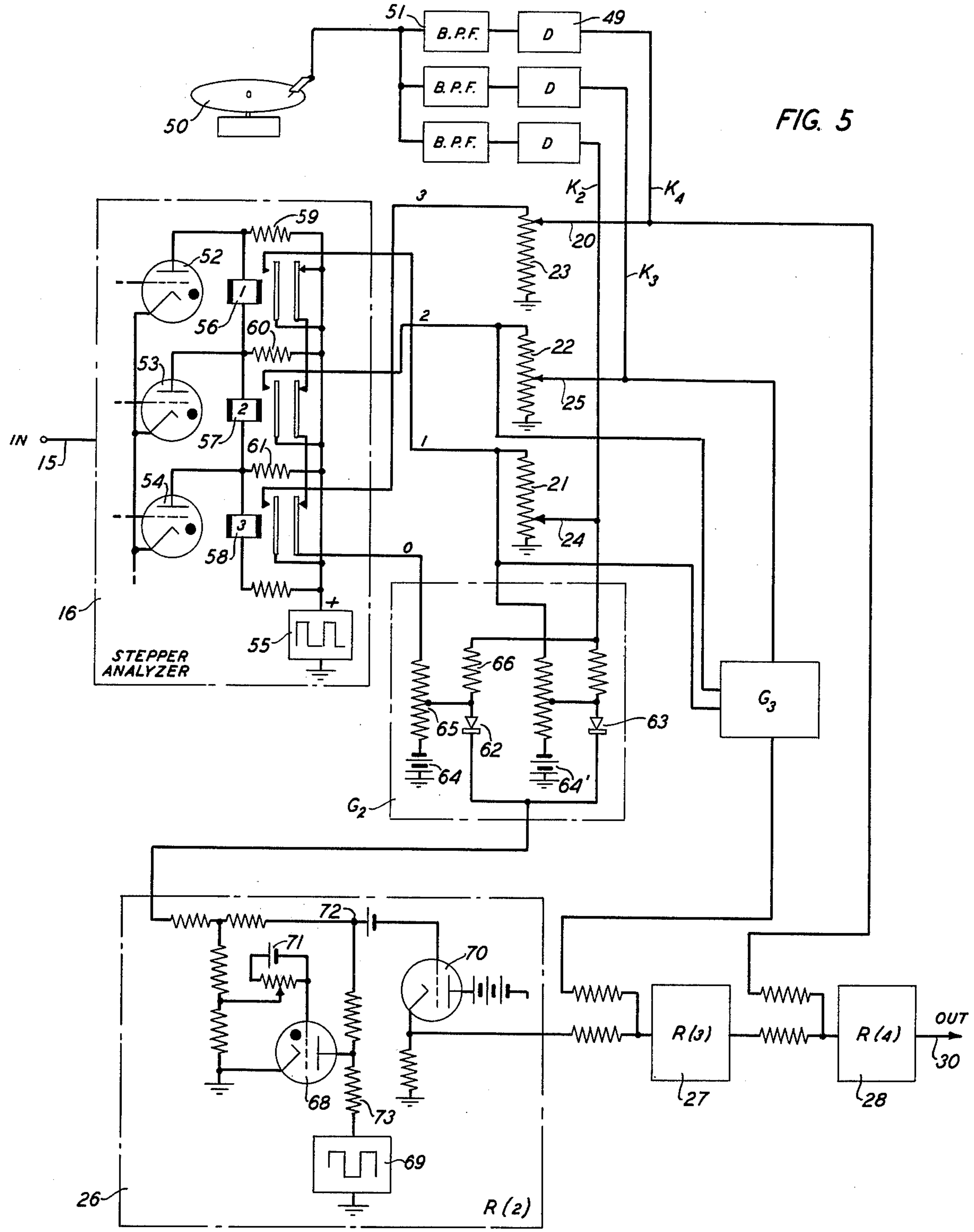
FIGS. 5 and 6 are corresponding circuit figures showing the circuits in detail.

FIG. 5 shows in greater detail circuits that might be used, in one type of embodiment, for the boxes in FIG. 3. The record 50 supplies the three keys which are recorded in the form of modulations of three carrier waves of different frequencies so as to be separable by means of the band-pass filters 51. Detectors 49 give direct current key currents.

The stepper analyzer 16 is of the same type that is shown in the Gannett application referred to and comprises gas-filled tubes 52, 53, 54 supplied with pulsating anode current from a source diagrammatically indicated at 55. This current enables the tubes to be fired for a brief interval and then restores them by interrupting the anode supply. The timing is chosen to fit the transmission requirements. For instance, if the apparatus in FIG. 5 is common to a number of vocoder channels, such as ten, provided with a scanning distributor whose output is connected to input terminal 15, and if the contact interval for each channel is 2 milliseconds, the stepper tubes are supplied with anode voltage in pulses of e.g. 1.5-millisecond length with interruption periods of 0.5 milliseconds between pulses. Different magnitudes of negative bias are provided for each stepper tube such that for input signal current smaller than 1 step no tubes fire, while for current of 1-step value tube 52 fires, for current of 2-step value tubes 52 and 53 fire and for current of 3-step value all three tubes fire. If no tubes fire, a positive pulse is applied to the zero output lead from source 55 over armatures and back contacts of all three relays 56, 57 and 58 in series. If only tube 52 fires, relay 56 is energized because of the potential drop across resistor 59. Relay 56 in energizing opens the series circuit through the back contacts of the relays and closes a circuit for applying positive voltage from source 55 through front contact of relay 56 to the step 1 output lead. If both tubes 52 and 53 fire, relay 56 does not respond but relay 57 becomes energized by the potential drop in resistance 60, putting positive voltage on the step 2 lead. Similarly relay 58 is energized if all three tubes fire, putting positive voltage on the step 3 lead.

The cross-connecting panel 18 is omitted for simplicity in this figure and the leads from the analyzer 16 go direct to potentiometers 21, 22 and 23. These have tap points for lines 20, 24 and 25.

The gap circuit $G_2$ is shown as comprising varistors (such as copper oxide rectifier elements) 62 and 63. Each of these is given a suitable bias from a battery 64 or 64' such as to render the element non-conducting in the absence of a positive voltage supplied from one of the output leads of the stepper analyzer. The key currents are, therefore, kept from transmission through these gaps by the bias voltage. When a positive voltage is applied from either the 0 or 1-step lead, the corresponding varistor 62 or 63 has its bias changed in the positive direction and its resistance greatly reduced so that it applies the key currrent and (in the case of varistor 63) any signal that may be present in line 24, to the reentry circuit 26. The resistances shown associated with each varistor assist in the circuit functioning and should be adjusted to give best operation. For example, the two halves or portions of resistor 65 allow the negative bias voltage to be removed from element 62 when the positive pulse appears on the step 0 lead but does not permit passage of current from source 55 through element 62 directly to reentry 26. Resistance 66 is made equal to that of element 62 in its high resistance condition so that no interference is caused between the different bias batteries and varistor elements. The gap $G_3$ is the same in construction and operation as gap $G_2$.

Reentry 26 comprises gas-filled tube 68 supplied with pulsing plate voltage from source 69 and a vacuum tube cathode follower stage 70. The grid of tube 68 is biased negatively from battery 71 to such an extent that the tube fails to fire when the input voltage is less than 2 steps but fires on input voltage of 2 steps or greater. When the tube fails to fire, the voltage at point 72 has the value corresponding to 0 or 1 step according as the input is 0 or 1 step. When the tube fires (for inputs of 2 steps or greater), current flow through resistor 73 drops the potential at point 72 by 2 steps. Tube 70 repeats these step values without reversing polarity to the input of reentry 27. Reentries 27 and 28 are similar to reentry 26 but have their constants including their grid bias proportioned to reenter at step 3 and step 4 respectively.

The record 50 and the pulsing power supplies for the stepper analyzer and for the reentries can be properly synchronized by use of a single constant frequency oscillator of high stability for furnishing driving frequency for the turntable motor and for the square-wave generators used for the pulsing sources. These pulsing sources may themselves be of known type such as those disclosed in an application of Lundstrom and Schimpf, Ser. No. 456,322, filed Aug. 27, 1942, which issued on July 29, 1975 as U.S. Patent 3,897,591, by way of example. The voltage pulses at 69 may coincide in time with those at 55 while the pulses in reentries 27 and 28 should come on 0.2 and 0.4 millisecond later, respectively, and should go off at the same time as the pulses at 55 and 69. This gives time for suitable stabilization of preceding reentry circuits before later ones operate. The output 30 may lead to anv suitable transmission channel, for example to a distributor for applying successive output pulses to different channels in rotation for transmission by multiplex method to the distant receiver.

Figure 6:
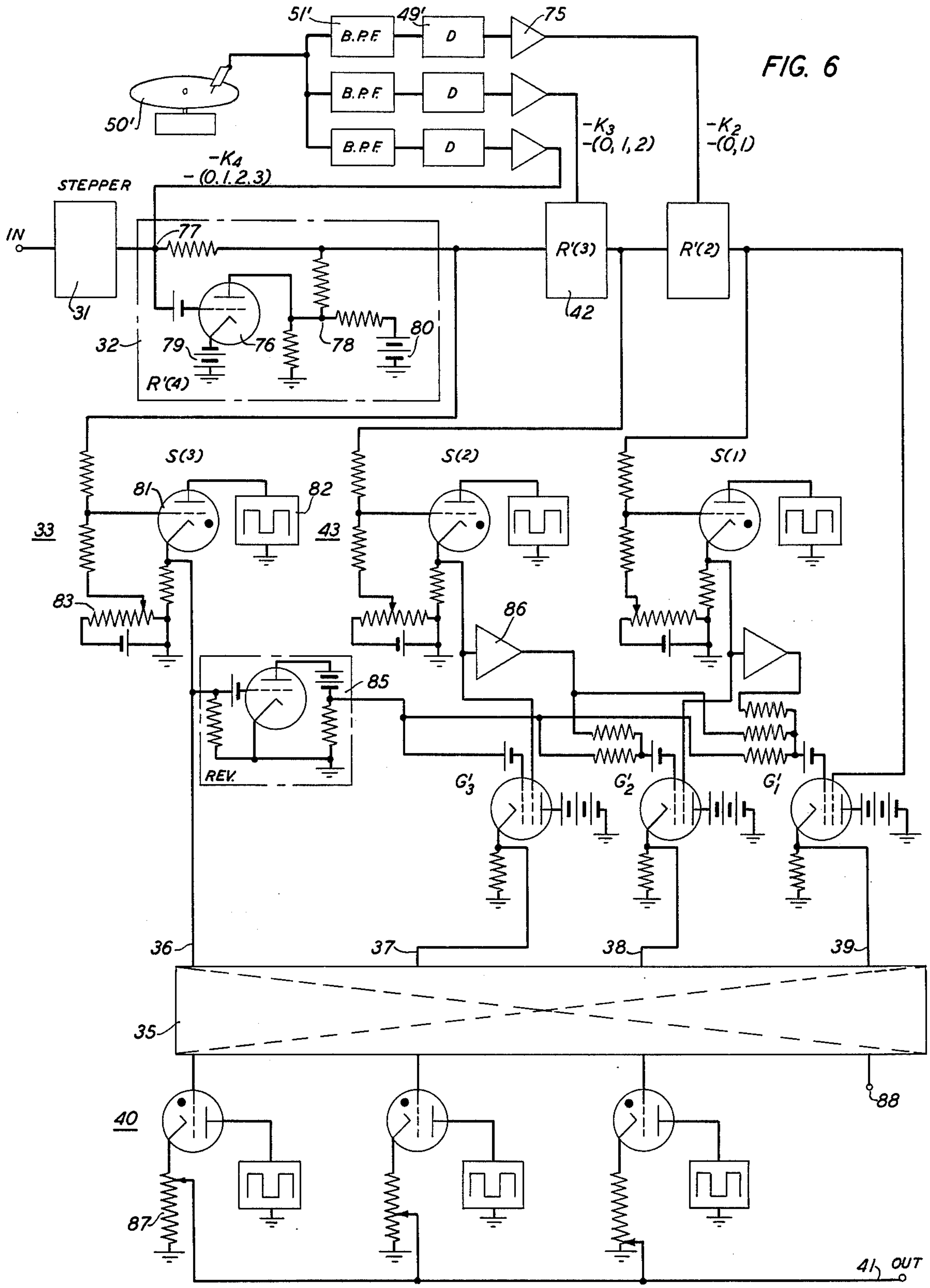

Referring to FIG. 6, the input terminal for the message stepper 31 may lead from a distributor or other suitable input circuit. The stepper 31 may comprise three differently biased gas-filled tubes which fire one, two, three or none at a time to set up output currents varying in steps. These currents are assumed to be positive and increasing with increasing step value. A phase reversing stage may be used if needed to produce the positive polarity pulses.

The key producing circuits are duplicates of those shown in FIG. 5 except that each key output includes a phase inverting tube 75 for giving opposite polarity key to that used at the sending end. This is in order to make a subtraction of the key from the incoming signal as previously explained.

The reentries are alike except for proportioning or adjustment of parts so that description of one reentry, 32, will suffice. This includes vacuum tube 76 which is conducting saturation current for zero and all positive voltages at point 77 but which is cut off by application of negative voltage of step 1 or greater magnitude at point 77. When the tube is thus conducting, a balance exists at point 78 between negative battery 79 and positive battery 80, the connected resistances, including the tube 76, being proportioned to effect this balance so that zero voltage exists at point 78. When tube 76 is cut off, the voltage at 78 swings positive by four steps due to battery 80 and the connected resistances.

Stepper 33 comprises a gas-filled tube 81 having a pulsing anode supply 82 and an adjustable bias potentiometer 83 for setting the bias so that the tube fails for all applied voltages less than three steps positive. It will be noted that 3 steps is the maximum value of voltage applied to the input of this tube. The pulsing supply must be delayed in coming on by a small fraction of a millisecond after that for stepper 31. The pulsing supplies in the steppers 33, 43, etc. may be in time coincidence with each other.

The gaps $G_1'$, $G_2'$ and $G_3'$ are shown as tetrodes which are arranged to be made non-conducting by application to their inner grids of negative voltage from the reversing tubes 85, 86, etc. These latter tubes are normally cut off due to negative grid bias batteries but are rendered conducting when the corresponding stepper 33, etc. transmits current, making the stepper cathode positive toward ground. This drives the grids of the associated gap tubes far enough negative to disable them. When any gap tube such as $G_3'$ is not disabled, it repeats pulses from the cathode of its corresponding stepper tube such as 43, via its own cathode to input terminal such as 37 of cross-connecting frame 35.

The weighting circuits 40 each comprise a gas-filled tube having its cathode resistor 87 provided with a tap for deriving a certain step value of output voltage for application to common output conductor 41. One output terminal 88 of panel 35 is left open, corresponding to zero output. The gas tubes 40 do not fire unless a positive voltage is applied to their grids from one of the input terminals 36 to 39. Only one tube 40, of course, fires at a time.

Figure 7:
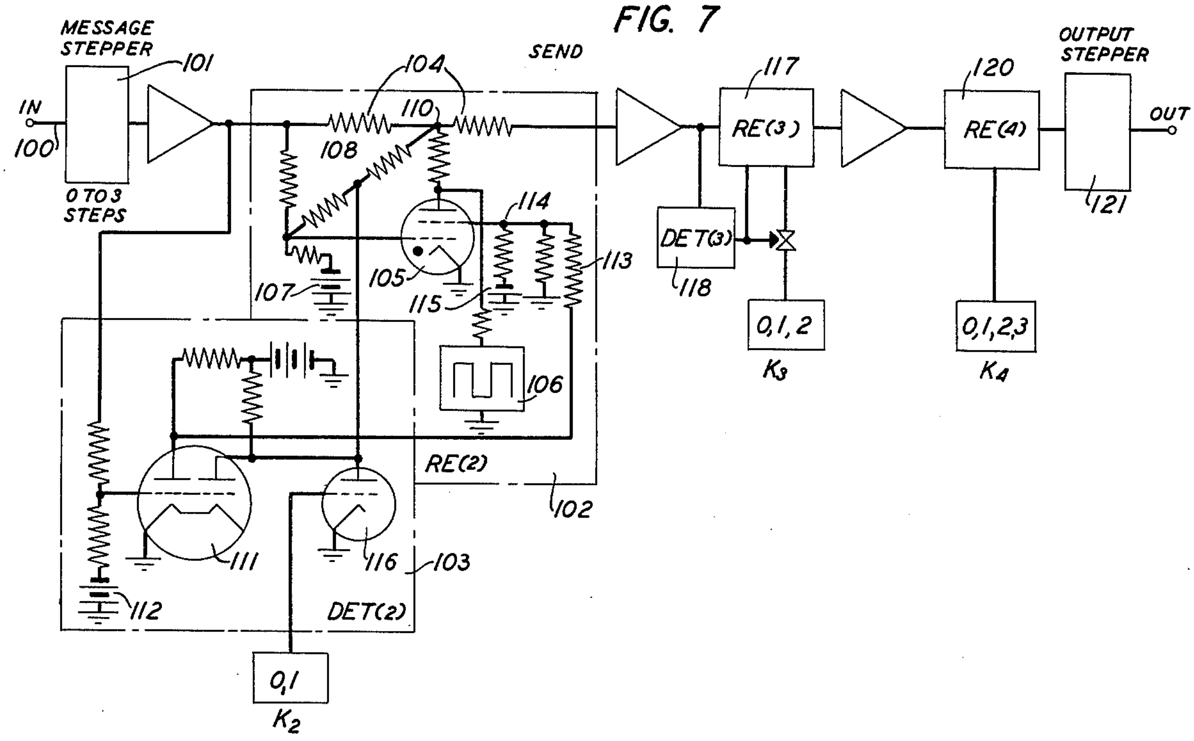
FIG. 7 is a schematic circuit diagram showing another form of embodiment of the invention, this being the transmitting station.

FIG. 7 shows a type of circuit in which the stepped signal values are all applied to one circuit path and in which provision is made for disabling individual reentry and key circuits in accordance with the step value of signals. When a reentry and key circuit are disabled, the signal passes through such reentry circuit without being affected by it. In the subsequent figures the kevs are merely indicated and it will be understood that thev may be produced in any suitable manner, for example from records as in the earlier figures.

The signal incoming at 100 is applied to message stepper 101 and the signal is assumed to comprise the 4-step range, 0 to 3 steps. If the signal is of 0 or 1-step value, it is combined with the key $K_2$ in reentry 102 and if the sum is 2 steps, reentry is made giving 0 step output, as heretofore. If, however, the signal alone has 2-step or greater value, it will operate detector 103 which cuts off the supply of key $K_2$ to the reentry circuit and also disables the reentry circuit so that the signal passes on through the series resistance 104 to the next reentry circuit. Amplifiers may be assumed where needed but they will be assumed where used not to invert the phase of the signals.

Referring more in detail to the reentry, it comprises gas-filled tube 105 supplied with pulsing anode voltage from 106. Its grid is biased negatively at 107 to prevent the tube from firing on input steps of 0 or 1 but to allow it to fire on an input of step 2. The key is added to the signal in a resistance bridge 108 to provide summation input steps on the grid. When the tube fires, it subtracts 2 steps of voltage from the output at the point 110.m Tube 105 can also be prevented from firing by application of a disabling negative voltage to its second grid even though the voltage applied to its control grid may be two steps positive or greater. The disabling voltage is applied under control of the detector 103 as will now be described.

Detector 103 comprises double triode 111 having but a single grid extending through both triode sections. This grid is normally biased by battery 112 so that the tube remains cut off unless a positive voltage of 2 steps or greater is received from the line. When this occurs, the tube transmits saturation current and its plate voltage drops to near zero or to a very low value. The left-hand plate applies then too low a positive voltage to resistor 113 to hold the point 114 any longer positive and this point is driven so far negative from battery 115 that tube 105 is prevented from firing.

The right-hand plate of tube 111 lowers the plate voltage of tube 116 to too low a value to allow that tube to transmit the key voltages from $K_2$ to the reentry circuit. Thus on application to the reentry circuit of step 2 or higher signals, both the reentry tube and the key supply are disabled.

Reentry circuit 117 and detector 118 are similar except that the adjustments are such as to cause reentry to occur at step 3 and to cause detector 118 to disable the reentry and key in response to receipt from the previous reentry of current having step 3 or greater value. Reentry circuit 120 is similar but reenters at step 4 and has no disabling detector.

It is seen, therefore, that in FIG. 7 a step 3 signal is not affected by either reentry circuit 102 or 117 but is combined with $K_4$ and reenterd at 120 if the summation current is 4 steps or greater. A signal of step 2 value is combined with $K_3$ in reentry 117 and the resultant, reentered or not depending upon the key value, is then combined with $K_4$ and reentered if the summation current is big enough. A signal of 1-step value is combined with all three keys. Zero value of signal merely allows the three keys to be combined, reentered if reentry is called for, and sent. The output of reentry 120 may be impressed on an output stepper 121 and sent over any suitable channel.

Figure 8:
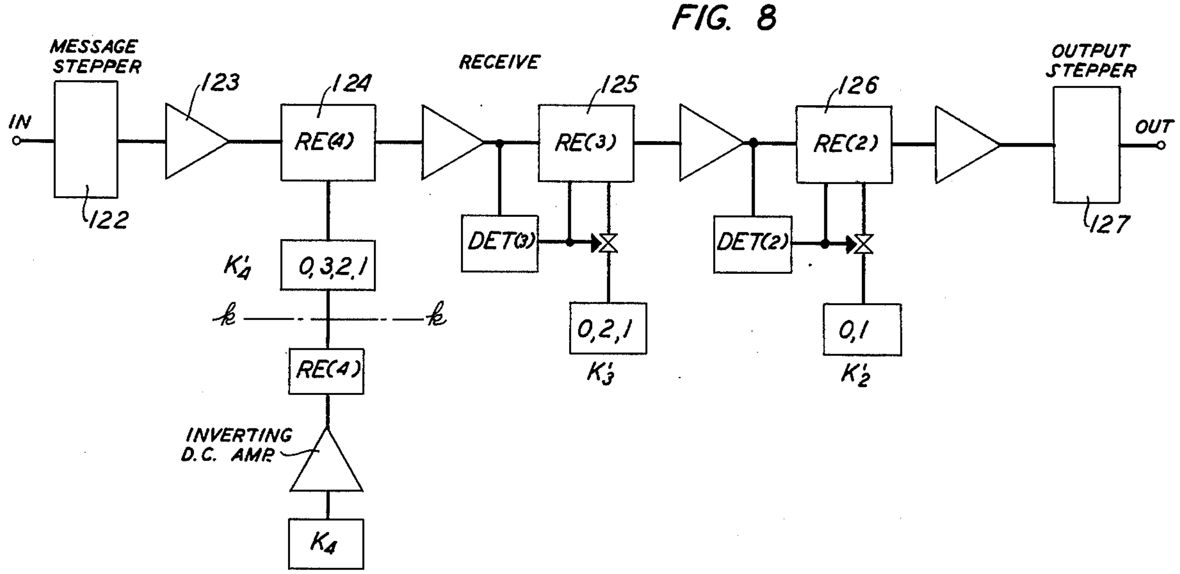
FIG. 8 is a similar diagram of the receiving station for receiving signals from the type of station shown in FIG. 7.

The receiving circuit shown in FIG. 8 employs reentry circuits and detectors which may be duplicates of the corresponding ones in FIG. 7. The keys $K_4'$ etc. indicated in FIG. 8 are however (except for step 0) the inverse of the keys used in FIG. 7, 3-step key in FIG. 8 being used when the key in FIG. 7 was 1 step, and so on. This inversion can be obtained by including an inverting stage in the key supply channels in the case of FIG. 8, adjusted to give an output of 4, 3, 2, 1, followed by a reentry circuit reentering at step 4 to change step 4 to step 0. This is indicated for $K_4$ below the dotted line *k—k*.

No further description apears necessary in connection with FIG. 8 but it will be shown how particular signals are decoded by way of example. If the keyed signal sent was 3 steps and the key 0, the 3-step current passes into reentry 124 where it is combined with a zero key giving an output of 3 steps which passes unchanged through reentry circuits 125 and 126 both of which are prevented from adding keys or reentering. The 3-step signal arrives therefore at output stepper 127. If the input signal was 3 steps and the key ($K_4$) was 1, the output from reentry 120 was zero. This has added to it a 3-step key giving the original signal. If the input signal was 1 step and the keys used in FIG. 7 were successively 0, 1 step and 3 steps, the output from 102 is 1 step, the output from 117 is 2 steps and the output from 120 is 1 step. The output from 124 is, then, 2 steps, the output from 125 is 1 step and the output from 126 is 1 step, giving the original signal.

The use of an inverted key can be obviated by inverting the signal at some point in the transmission between enciphering and deciphering points and again inverting the signal after deciphering. One inversion can be made in the message stepper 122, for example, or by making the amplifier 123 an inverting direct current amplifier; and the other inversion can be made in output stepper 127 or in an amplifier such as 128. If this is done, duplicate key currents can be used at sending and receiving stations, no key inverting being necessary at one station relative to the other.

What is claimed is:

1. A signal value permuting system comprising a succession of reentry circuits having successively higher reentry point values, means to send signals through a plurality of said reentry circuits in tandem, and a key for each reentry circuit, means to add key and signal values together at the input side of each reentry circuit, each key having a range of values the maximum value of which is lower than the reentry point value of the reentry circuit with which the respective key is associated.

2. A signal value permuting system for signals varying in steps comprising a succession of reentry circuits having reentry points differing by one step from one to the next reentry circuit, a source of key currents varying in steps for each reentry circuit, the maximum step value of each key current source being one step below the reentry point of the corresponding reentry circuit, means to supply signal and key currents to the first reentry circuit to produce combined signal and key currents in the output thereof, and means to supply to each succeeding reentry circuit the corresponding key current and the currents in the output of the next preceding reentry circuit.

3. In a signal system, at least two reentry circuits in tandem, the first having a reentry point one step lower than the reentry point of the second, a source of stepped key currents for each reentry circuit, the key currents for each reentry circuit having a maximumm step value one step lower than the reentry point of the respective reentry circuit, means to apply to the first reentry circuit signals varying in steps within a range below the reentry point of said latter circuit and means to apply to said second reentry circuit signal currents varying in steps including the current received from the first reentry circuit in the step range below the reentry point thereof and other signal currents of step value in excess of said range.

4. In a signaling system, a source of signal currents varying in steps, a first, a second and a third reentry circuit in tandem, having ascending step values of reentry point in that order, a first, a second and a third source of key currents of successively higher step range, each source associated with the corresponding reentry circuit and having a maximum step value one step lower than the reentry point of the associated reentry circuit, means operating in response to the step value of the signal currents to apply step-three signal current only to the third reentry circuit together with key currents from the third source, means operating in response to the step value of the signal currents to apply step-two signal current to only the second reentry circuit together with key currents from the second source, means operating in response to the step value of the signal currents to apply step-one signal current only to the first reentry circuit together with key currents from the first source, and means to apply the output current of each reentry circuit to the next succeeding reentry circuit together with the key currents from the respective associated source.

5. In a signaling system, a succession of reentry circuits, a source of key currents associated with each reentry circuit, said reentry circuits having reentry points varying in ascending steps throughout the succession, a source of stepped signal currents, means to apply maximum value signal currents to the last reentry circuit together with the key currents associated therewith, means to apply signals having a step value one step below said maximum value to the next preceding reentry circuit together with the key currents associated therewith and means to apply the output of the last-mentioned reentry circuit to the final reentry circuit of the succession together with the key currents associated therewith; means to apply signals of next lower step value to the next preceding reentry circuit together with the key currents associated therewith and means to pass the output thereof in succession through the succeeding reentry circuits and to combine the currents so passed from each reentry circuit to the next with the key currents associated with the respective reentry circuit.

6. In a signaling system, a source of signals varying in steps, a succession of reentry circuits having reentry points varying by one step from each reentry circuit to the next, a source of stepped kev currents associated with each reentry circuit and having a step range one step less than the reentry point of the respective reentry circuit, means operating in accordance with the step value of the signal to apply signals only to certain reentry circuits according as the signal has a step value one step below the reentry point of the respective reentry circuit, means to apply with such signal the key currents associated with the respective reentry circuit to encipher the applied signal current therein, and means to impress upon each reentry circuit together with the key currents associated therewith the currents enciphered in the next preceding reentry circuit, if anv.

7. The invention claimed in claim 6 in which said means operating in accordance with the step value of the signal comprises a normally disabled connection between said source of signals and a respective reentry circuit and means for enabling said connection under control of signal currents.

8. The invention claimed in claim 6 in which said means operating in accordance with the step value of the signal comprises normally enabled reentry circuits and key current connections to each reentry circuit, and means for disabling respective reentry circuits and kev current connections therefor under control of signal currents.

9. A deciphering circuit for received enciphered signals comprising a succession of reentry circuits varying in the reentry point value by one step from one circuit to the next, an output terminal for deciphered signals, a source of key currents for each reentry circuit, having a step range one step less than the reentry point value of the respective reentry circuit, means to pass the received signals through different numbers of said reentry circuits in succession depending upon the step value of the output current of a respective reentry circuit, and means controlled by the step value of such output current for transmitting deciphered signals to said output terminals from a given reentry output without further decipherment in succeeding reentry circuits.

10. The invention according to claim 9 in which said last means comprises means for converting succeeding reentry circuits into simple repeating paths that merely repeat currents from their input to their output sides without performing any reentry function, and means for disabling the keys associated with such succeeding reentry circuits.

11. The invention according to claim 9 in which said last means comprises normally disabled paths leading from the output of each such succeeding reentry circuit to said output terminal for transmitting deciphered signals thereto when such paths are enabled, and means operated by deciphered signal current in the output of the preceding reentry circuit for enabling the path leading from the output of a succeeding reentry circuit.

12. In a secret signaling system for stepped signals, a succession of reentry circuits having reentry points differing by one step from one circuit to the next, a source of key currents for each reentry circuit having a step range one less than the step range included below the reentry point of the respective reentry circuit, the number of reentry circuits in tandem being one less than the maximum number of steps including zero comprised in the signal, and means operating in response to the signal strength to cause signals of lowest step value to pass through a greater number of said reentry circuits in succession, and to be combined with said respective key currents, than do signals of greater step value.

* * * * *